United States Patent [19]

Townsend

[11] Patent Number: 4,884,099
[45] Date of Patent: Nov. 28, 1989

[54] AUTOMATIC ADJUSTMENT OF FOCAL LENGTH TO OBTAIN DESIRED OPTICAL REDUCTION RATIO IN A MICROFILM CAMERA

[75] Inventor: Ensley E. Townsend, Rochester, N.Y.

[73] Assignee: Eastman Kodak Company, Rochester, N.Y.

[21] Appl. No.: 204,795

[22] Filed: Jun. 10, 1988

[51] Int. Cl.⁴ ............................................. G03B 27/52
[52] U.S. Cl. ....................................................... 355/55
[58] Field of Search ................... 355/55, 14 R, 24, 56, 355/27; 354/286

[56] References Cited

U.S. PATENT DOCUMENTS

| | | | |
|---|---|---|---|
| 3,832,058 | 8/1974 | Gusovius | 355/56 |
| 3,946,222 | 3/1976 | Swanberg | 250/201 |
| 4,268,165 | 5/1981 | Bradmon | 355/55 |
| 4,316,668 | 2/1982 | Miller | 355/55 |
| 4,412,737 | 11/1983 | Iwanade et al. | 355/55 |
| 4,441,805 | 4/1984 | Smith | 355/14 R |
| 4,552,450 | 11/1985 | Tomosada et al. | 355/14 |
| 4,610,539 | 9/1986 | Kaneko et al. | 355/77 |
| 4,629,308 | 12/1986 | Landa et al. | 355/3 R |
| 4,636,061 | 1/1987 | Staude et al. | 355/24 |
| 4,647,190 | 3/1987 | Nitsch et al. | 355/55 |

Primary Examiner—Richard A. Wintercorn
Attorney, Agent, or Firm—Dennis R. Arndt

[57] ABSTRACT

A microfilm camera is capable of automatically selecting one of a plurality of different focal lengths available on a zoom lens to obtain the desired optical reduction ratio. A user operator enters, via a keyboard, the desired optical reduction ratio into the main or host computer resident in the microfilm camera. The computer through appropriate communication with a microcomputer atuomatically adjusts the lens to the appropriate lens focal length that corresponds to the selected optical reduction ratio and automatically establishes the film tansport speed that will be synchronized in the correct ratio to the document transport speed in accordance with the desired reduction ratio.

7 Claims, 6 Drawing Sheets

AUTOMATIC ADJUSTMENT OF FOCAL LENGTH TO OBTAIN DESIRED OPTICAL REDUCTION RATIO IN A MICROFILM CAMERA

TECHNICAL FIELD

The present invention relates to an automatic microfilm camera in which the optical reduction ratio is automatically selected by the operator through a keyboard which communicates with a microcomputer to control a motor used to adjust a zoom lens to the required focal length that corresponds to the desired reduction ratio.

CROSS REFERENCE TO RELATED APPLICATIONS

Reference is made to commonly-assigned copending U.S. patent application Ser. No. 204,794, entitled "AUTOMATIC LENS SELECTION FOR DESIRED OPTICAL REDUCTION RATIO IN A MICROFILM CAMERA, in the names of E. E. Townsend and R. V. Barry, and to U.S. application Ser. No. 204,836, entitled "SPEED CONTROL FOR FILM AND DOCUMENT TRANSPORT DRIVES IN A MICROFILM CAMERA, in the name of E. E. Townsend, filed concurrently herewith.

BACKGROUND ART

Microfilm copying is a process in which photographically reduced images of documents are sequentially formed, usually in successive frames on a reel of film, which is thereafter removed from the copy area. During this process, the film transport speed required for normal microfilming is directly proportional to the optical reduction ratio. In a rotary microfilmer, the document and film are in continuous motion during the microphotographing process.

Depending on the type of material being copied, different magnifications are desired, which is typically accomplished by manually replacing lenses of different focal lengths. There are a number of what can be considered standard reduction ratios in the industry, namely 24×, 40× and 50×; with some reduction ratios going as high as 150×. The selection of a particular ratio is based on a trade-off between clarity and ease of viewing the magnified image for the lower ratios, while the higher packing density of images on the film favors the higher reduction ratios.

In a so-called rotary microfilmer machine, the document and film are in continuous motion during the microphotographing process and the exposure is made through a narrow slit in a plate located in the optical path between the document and the film. Consequently, the size of the image in the direction of relative movement between the document and the paper is dependent on the relative speed of movement between those elements, which must be adjusted to maintain the proper aspect ratio of the copy when the magnification is changed.

The micrographics industry has relied on two techniques in the past to change from one optical reduction ratio to another. One technique involves replacing the entire camera subassembly comprising the lens and mechanical drive components. Thus, each camera subassembly is dedicated to one and only one reduction ratio. Such an arrangement is bulky, requiring additional storage space as well as being costly, requiring the duplication of a number of parts in each camera subassembly. The second technique has two or three lenses adjacently mounted on a carriage control by a lever that will move the appropriate lens on the carriage into position. It is also common that the same lever is used to select the speed ratio by shifting gears or changing pulleys to adjust the transport and film speeds so that they correspond to the reduction ratio selected.

DISCLOSURE OF THE INVENTION

It is an object of the present invention to provide an automatic microfilm camera having a zoom lens capable of being adjusted to a plurality of different focal lengths that correspond with designated image reduction ratios. The camera comprises a means for adjusting the lens to any desired focal length within a given range. Electronic means, in the form of a microcomputer, are provided for controlling the adjusting means. Information is supplied by input means, such as a keyboard, to the electronic control means, to allow the selection of a desired one of the plurality of focal lengths which corresponds to the required image reduction ratio.

Another object of the present invention is to eliminate the disadvantages associated with the changing of lenses whenever a different optical reduction ratio is required.

Another object of the computer programmable selection of the optical reduction ratio is to eliminate the requirement of additional hardware components to accommodate changes in the optical reduction ratios by merely requiring the entry into a keyboard of a number which corresponds to the desired ratio.

Still another object is to provide a continuous range of optical reduction ratios by controlling the position of a zoom lens. Alternatively, preselected standard optical reduction ratios could be provided by using a zoom lens having preselected positions which correspond to the standard reduction ratios.

BRIEF DESCRIPTION OF THE DRAWINGS

Modes of carrying out the invention will be described with reference to the drawings, wherein.

MODES OF CARRYING OUT THE INVENTION

Because automatic microfilm cameras are well known, the present description will be directed in particular to the elements forming part of the present invention and its use in such photographic cameras. It will be understood that camera elements not specifically shown or described may take various forms well known to those having ordinary skill in the art.

Figure 1:
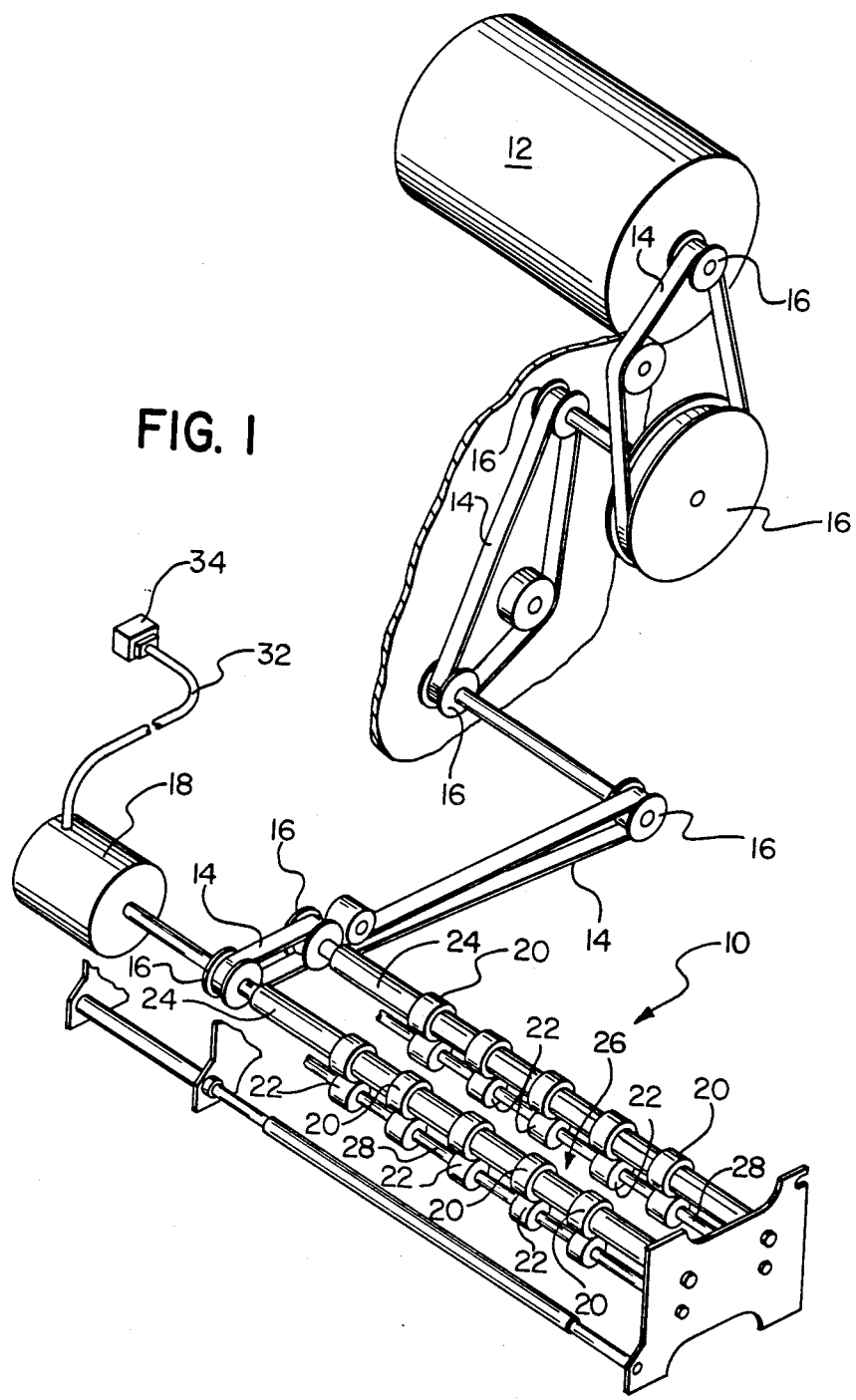
FIG. 1 is a schematic perspective diagram illustrating the basic components of the document drive system according to the present invention.

The drive mechanism for the document transport system 10 shown in FIG. 1 comprises a main drive AC motor 12, drive belts 14, drive pulleys 16, optical incremental encoder 18, drive rollers 20, normal force rollers 22 and drive roller shafts 24. The main drive AC motor 12 is powered from the AC electric main supply (not shown) and the motor 12 supplies mechanical power to the document transport system 10, including all the drive rollers 20. Mounted on the shaft of the main drive motor 12 is a pulley 16, which directs the mechanical power of the motor 12 through a series of belts 14 and pulleys 16 to the drive rollers 20 mounted on shaft 24. What is commonly known as the photographic aperture or exposure station is generally shown at 26. It is located in the space between the drive roller shafts 24 and the two sets for normal force rollers 22 mounted on shafts 28. Normal force or pressure rollers 22 urge the document against the drive rollers 20, so that the document is moved through the photographic aperture or exposure station 26, where the document is illuminated and photographed by means not shown.

The optical incremental encoder 18, sometimes referred to as an aperture encoder or shaft encoder, is mounted directly to the first drive roller shaft 24. The frequency of the aperture encoder's output signal is the product of the drive roller shaft's angular velocity in revolutions per second, and the encoder's resolution in line pairs per revolution. A line pair of the encoder's disk results in one cycle, consisting of a rising and a falling edge of the square wave output. The greater the number of line pairs, the finer each revolution may be divided so that the accuracy and speed control are increased accordingly. The encoder signal is fed to a servo control electronics board 30 illustrated in FIG. 2, via cable 32 attached by connector 34 (FIG. 1). DC power is also delivered from the servo electronics board 30 by the cable 32 to the optical encoder 18.

Film Drive

Figure 2:
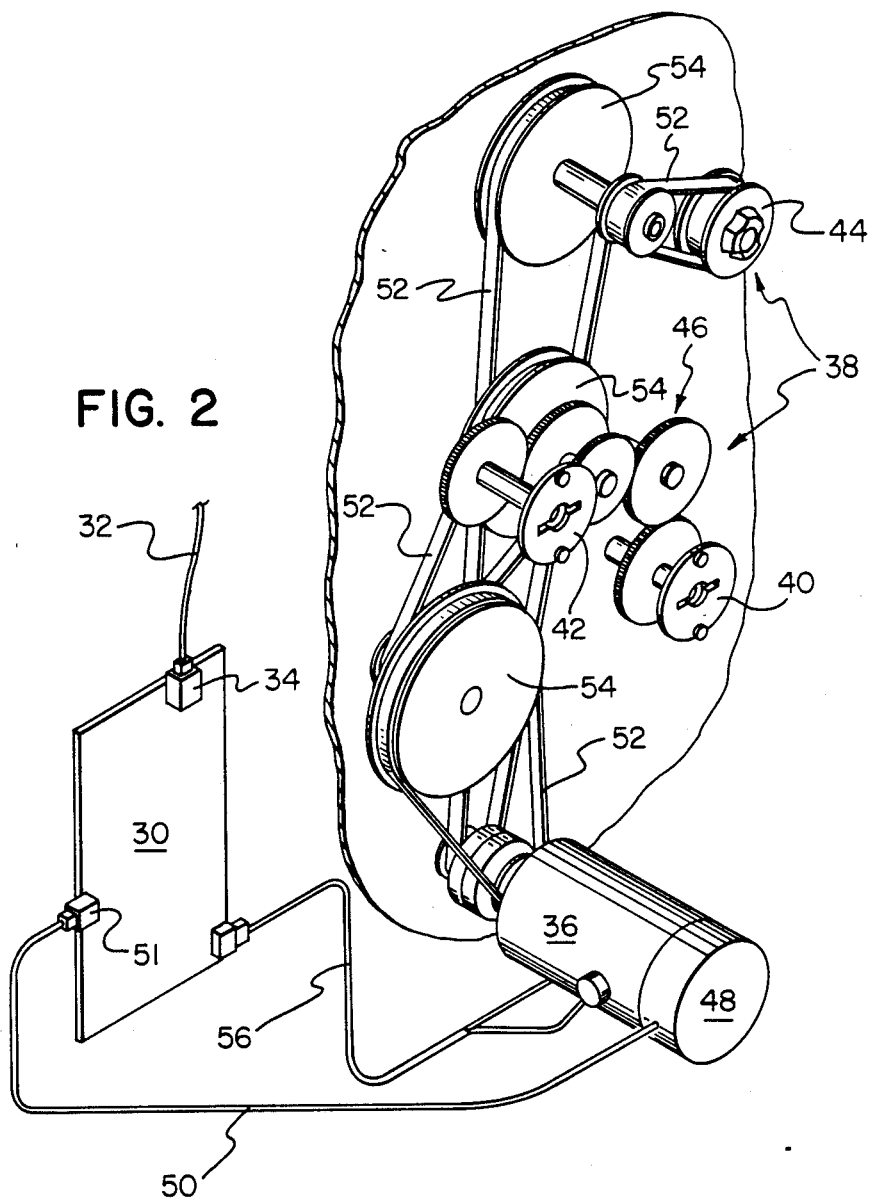
FIG. 2 is a schematic perspective diagram of the film drive's major control and drive components according to the present invention.

DC motor 36, illustrated in FIG. 2, supplies power to the film drive shown generally at 38 and is comprised of film supply drive 40, film take-up drive 42 and film metering roller drive 44. Power from the DC motor 36 is transferred by a series of drive belts 52 and drive pulleys 54 to the film drive components 40, 42, and 44. An appropriate gear drive 46 is provided to maintain the required tension and film speed between the film take-up 42 and the film supply 40 during film transport. The film is exposed at the film metering roller drive 44 (by means not shown). Accordingly, it is necessary that the angular rotation of the metering roller drive 44 is controlled in such a way that the motion of the film is correlated accurately with the linear velocity of the document. The servo control electronics board 30, also referred to as servo board, control the angular rotation of the DC motor 36 and hence the angular rotation of the metering roller drive 44 to ensure proper coordination of the film motion to the document motion for a given reduction ratio. The optical incremental encoder 48 is mounted directly to the shaft of the DC motor 36 for the most accurate control of the motor speed. The feedback encoder 48 provides a TTL output waveform indicative of the angular velocity of the shaft of DC motor 36. The frequency of the output waveform of the feedback encoder is the product of the angular velocity of the DC motor 36 in revolutions per second, and the resolution in line pairs per revolution of the encoder 48. The signal from the encoder 48 is fed into the servo board 30 via cable 50 connected to the board by plug 51 as shown in FIG. 2. The cable 50 is also used to transport DC power from the servo board 30 to the encoder 48. Another cable 56 is connected between the servo board 30 and the DC motor 36 and provides the requisite power to the DC motor 36 to maintain the correct controlled speed for the film drive 38.

Figure 3:
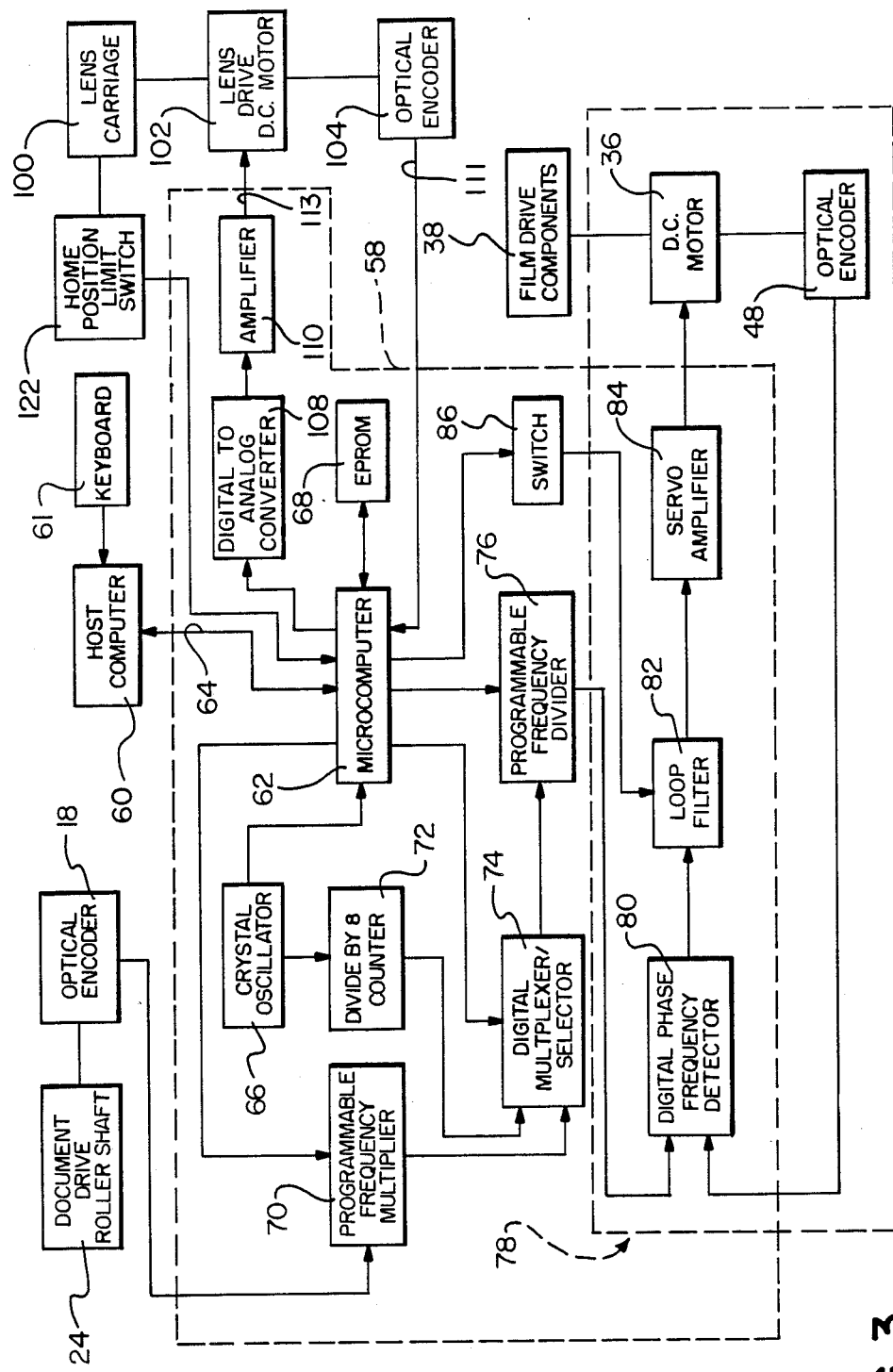
FIG. 3 is a schematic block diagram illustrating the electronics forming a part of the present invention.

FIG. 3 illustrates the major functional elements contained on the servo electronics board 30 and some of the external elements that are connected to the board 30. The broken line 58 indicates the electronic board 30 and all elements within its boundary reside on the electronics board 30.

The host computer 60 is the main control computer for the microfilmer; it is this computer that sends commands such as film drive 'start' and 'stop' and film speed 'select' to the electronic board 30 where microcomputer 62 is located. The microcomputer 62 transmits status information related to the operation of the film drive 38 to the host computer 60. The microcomputer 62 is a single-chip, 8-bit microcomputer such as the Intel 8032, which contains, among other functions, 256 bytes of RAM memory, three 16-bit timer/counters, six interrupt sources and a programmable full duplex serial communication channel 64. It is used for communication between microcomputer 62 and the host computer 60. A crystal oscillator 66 is a typical quartz crystal oscillator with a TTL output at 11.05920 MHz and is used to provide the internal clocking and timing signals of the microcomputer 62. In addition, crystal oscillator 66 provides a clock signal, as will be described later, which can be selected as the reference signal input for the servo system controlling the DC motor 36 and film drive 38 instead of the signal derived from aperture encoder 18. EPROM 68 is an erasable programmable read-only memory, such as a Hitachi Part No. HN27512G-25. EPROM 68 contains the program memory for microcomputer 62 in the form of firmware, which is to be executed by microcomputer 62. The output frequency of aperture encoder 18 is directed to programmable frequency multiplier 70, which multiplies the frequency by a programmable multiplier, so that the resulting frequency at the output is on the order of 1 MHz, with a fixed phase relationship to the output frequency of the aperture encoder 18. The frequency multiplier 70 will be discussed in greater detail below.

A divide by 8 counter 72, that receives the output from crystal oscillator 66, may be any synchronous 4-bit binary counter such as a Texas Instruments SN74ALS161A. The output of counter 72 is one eighth the frequency of crystal oscillator 66. A digital multiplexer/selector 74, such as a Texas Instruments SN74ALS153, can select as its output either the output from programmable frequency multiplier 70 or the output from divide by 8 counter 72. Microcomputer 62 determines which of the inputs is to be selected by the digital multiplexer 74 and sent to a programmable frequency divider 76. The programmable frequency divider 76 may take the form of an Intel 8254. The divider 76 functions such that its TTL output is equal to the frequency of the input wave form (i.e., from the digital multiplex/selector 74) divided by a count modulus n (counter divide ratio) which is computer programmable via microcomputer 62.

As mentioned earlier, the source of the output waveform from the programmable frequency divider 76 may be either the aperture encoder waveform 18 (after passing through programmable frequency multiplier) or the crystal oscillator waveform 66 (after passing through divide by eight counter 72), depending on which is selected by microcomputer 62. The waveform from aperture encoder 18 is selected as the reference frequency input signal for document filming operations and, in these instances, the angular velocity of the DC motor 36 is controlled so that it is synchronized to the angular velocity of the drive roller shaft 24. Accordingly, the film's velocity is then synchronized, by some predetermined ratio, to the document's velocity. The waveform from crystal oscillator 66 is selected as the input to the programmable frequency divider 76 if it is desired to operate the film drive 38 independently of the motion of the document transport 10. Such independent operation might be used, for example in conjunction with high speed film advance, where the film drive is activated irrespective of whether or not the document drive is operational. It is possible, but not usually advantageous, for the crystal oscillator 66 to be selected as the reference input signal for normal microfilming operations. In this situation, the film drive 38 is operated asynchronously with respect to the document transport 10. The disadvantage of this type of operation is that the film image is now more sensitive to disturbances that occur in the document transport with no means being provided for automatically adjusting the film speed in response to those disturbances.

The output of the programmable frequency divider 76 acts as an input to phase-locked loop system 78, which comprises the following: digital phase frequency detector 80, loop filter 82, servo amplifier 84, DC motor 36 and optical encoder 48. Digital phase frequency detector 80 generates an error voltage at its output that is proportional to the frequency and/or phase difference between the TTL input waveforms from the programmable frequency divider 76 and the signal generated by the feedback encoder 48. The digital phase frequency detector 80 may be a Motorola MC4044. The loop filter 82 is an active filter consisting of resistors, capacitors, and operational amplifiers, such as the Texas Instruments μA741, and is used to stabilize the phase-locked loop system 78 and to generate a DC output signal, which is directly proportional to the error voltage placed on its input. The servo amplifier 84 is a DC amplifier which amplifies the output signal from the loop filter 82 so that it can be used to drive DC motor 36. The optical encoder 48 is connected to the shaft of the DC motor 36 and generates a signal proportional to the speed of the DC motor 36. This signal is compared by the digital phase frequency detector 80 to the output of the programmable frequency divider 76. Thus, the phase-locked loop 78 tracks the frequency of the reference waveform derived from the output of the programmable frequency divider 76 and maintains a fixed phase relationship between the feedback waveform from the optical encoder 48 and the output from the programmable frequency divider 76. Consequently, the angular velocity of the DC motor 36 tracks the angular velocity of the document drive roller shaft 24 which results in the motion of the film being synchronized by some given ratio to the motion of the document. A dual single-pole-single-throw analog switch 86 such as that manufactured by Precision Monolithics Incorporated, Part No. SW-05 is used by the microcomputer to turn the DC motor 36 on and off, which in turn starts or stops the film drive 38.

Figure 4:
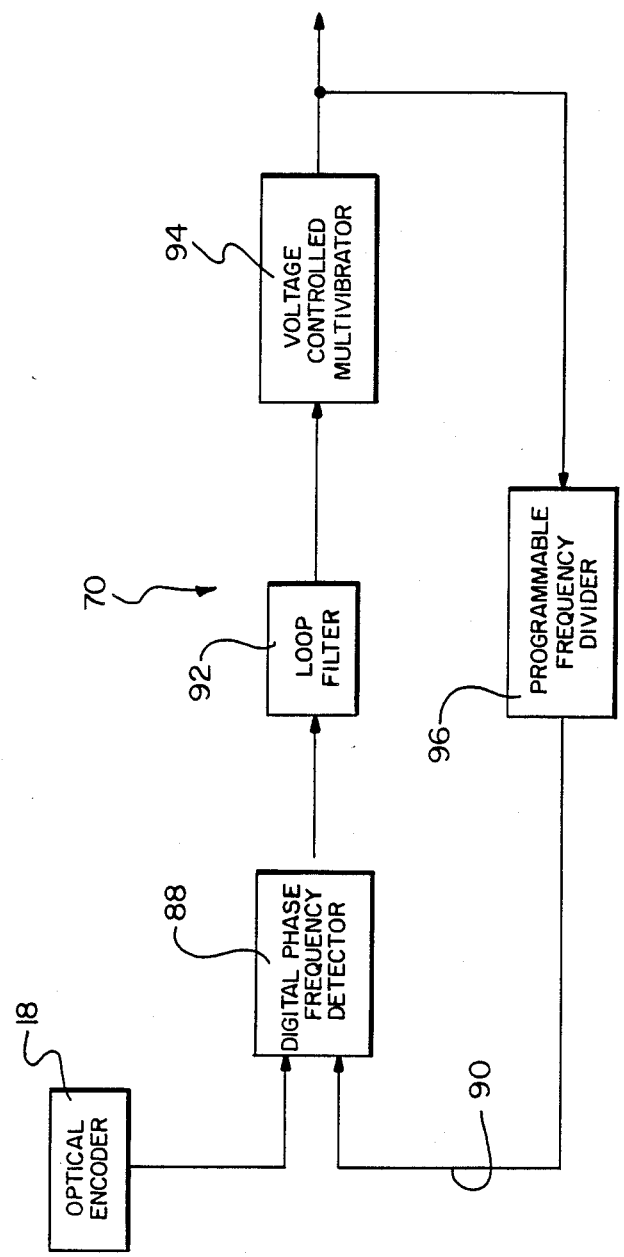
FIG. 4 is a schematic block diagram illustrating in more detail the contents of the programmable frequency multiplier illustrated in FIG. 3.

The programmable frequency multiplier 70 also uses phase-locked loop techniques internally and is actually a frequency synthesizer with a variable frequency input and a variable frequency output. FIG. 4 illustrates the functional elements of programmable frequency multiplier 70. A phase frequency detector 88 generates an error voltage that is proportional to the frequency and/or phase difference of the TTL signals occurring at its input, which are the output signal from the optical encoder 18 and the feedback signal on line 90. A loop filter 92 consisting of resistors, capacitors, and an operational amplifier such as a Texas Instrument μA741 is used to stabilize the loop and generates at its output a DC voltage which is directly proportional to the error voltage signal appearing on the output of phase frequency detector 88. A voltage controlled multivibrator 94, such as the Motorola MC4024, accepts as its input the DC control voltage (in the range of 2.5V to 5.5V) from the output of the loop filter 92 and generates an output TTL signal, the frequency of which is in the range of 1.0 MHz to 5.0 MHz. A portion of this output signal is fed back through a programmable frequency divider 96 such as an Intel 8254, which is a 16-bit programmable counter. The output of the programmable frequency divider 96 follows the waveform of the optical encoder 18 in frequency, but exhibits a small but fixed phase relationship relative thereto. The TTL output waveform found on the output of the voltage controlled multivibrator 94 is phase-locked to the output signal of the optical encoder 18. The frequency of the output is directly proportional to the frequency of the output signal from the optical encoder 18. The constant of proportionality between the two signals is the count modulus (counter divide ratio) of the programmable frequency divider 96. The count modulus is computer programmable by the microcomputer 62.

The frequency of the output waveform from the programmable frequency multiplier 70 can be controlled within the limits of the voltage controlled multivibrator 94 (1.0 MHz to 5.0 MHz), despite changes in the frequency of the signal generated by optical encoder 18. As noted previously, the frequency of the signal generated by the optical encoder 18 changes when the angular velocity of the drive roller shaft 24 changes, which in turn is reflected in a change in the signal generated by optical encoder 18. It should be noted that it may be desirable to use a higher quality optical encoder, one that has higher resolution and eliminates the use of the programmable frequency multiplier 70. However, at the present time, optical encoders that provide an output signal on the order of megahertz would be very costly and in addition, would be too large to fit conveniently in the available space. Therefore, it appears that, for the present time at least, the use of a programmable frequency multiplier provides a practical and inexpensive method of achieving a high resolution equivalent optical encoder frequency, on the order of a megahertz, by using readily available, small size, low-resolution, inexpensive optical encoders.

In addition to the circuitry shown and discussed above, there are circuits that monitor operating conditions associated with the servo system and report such conditions to the host computer. In addition, the results of this diagnostic operation is made available to the microfilmer's service personnel and in a more limited form, the operator. The microcomputer 62 shuts down the film drive 38 by stopping the DC motor 36 whenever improper operation is detected in one or more of the major components.

By the addition of one encoder, information concerning film usage may be monitored by the computer. Film usage may be determined by feeding film drive encoder pulses into a counter. Use of an additional optical encoder on the film supply indicates when the film supply has completed a complete revolution. The computer is then given information as to the circumference of the film drive roller and the circumference of the film supply reel, which may be used to determine the number of film driven encoder pulses per revolution of the film supply reel. Thus, by knowing the film thickness and the diameter of the empty film reel core, the length of film remaining on the supply reel can be calculated. Alternatively, a look-up table could be generated experimentally, with an index to the look-up table representing the pulses from the film drive encoder per one revolution of the supply reel. Separate tables could be made for different thicknesses of film.

Automatic Selection of Optical Reduction Ratio

Figure 5:
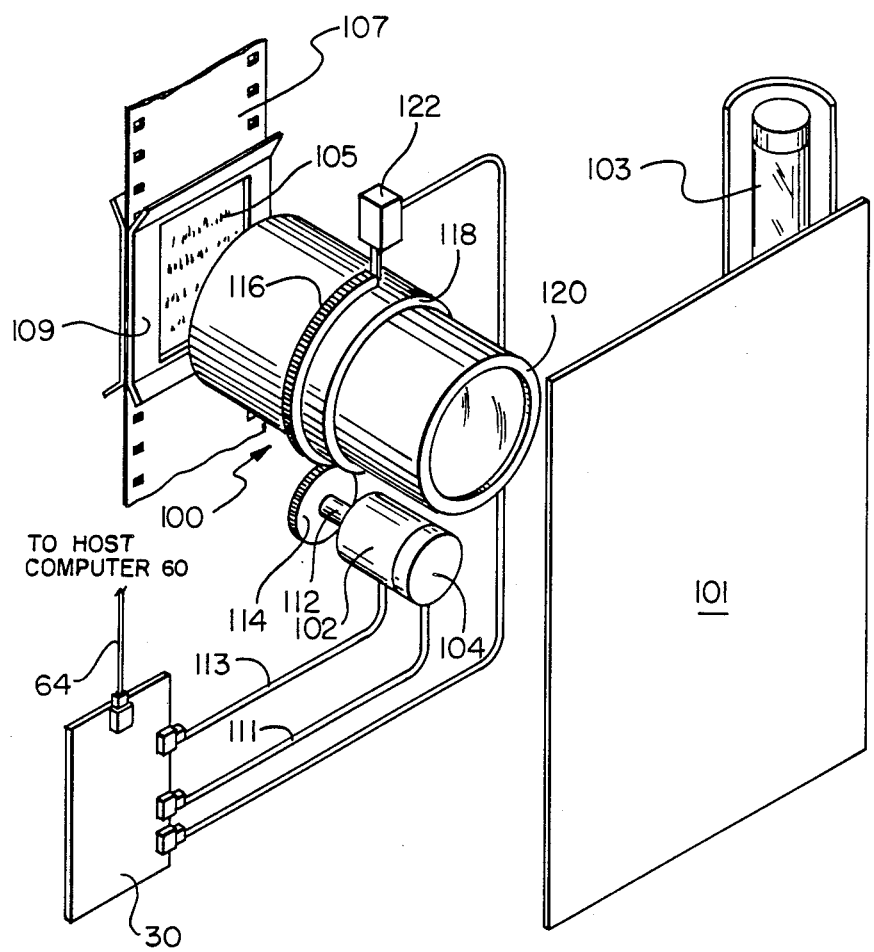
FIG. 5 is a schematic perspective diagram of the zoom lens and the drive components associated therewith.

In a preferred embodiment of the invention, a variable focal length lens or zoom lens 100 is attached to a mechanical drive element such as a DC motor 102 (FIG. 5). Use of a variable focal length lens may be implemented in one of two ways: (1) use of a zoom lens with a continuously variable focal length between the lower and upper focal length limits of the lens, or (2) a zoom lens with a fixed number of discrete focal lengths within a given range and each focal length being selectable.

Use of a zoom lens with a number of preset discrete focal lengths would have the movable elements arranged to move to a number of discrete positions corresponding to standard reduction ratios. The movable elements are driven by the lens drive motor 102 which uses an integral optical incremental encoder 104 mounted on the rear of motor shaft 112 of motor 102 the output of which is connected to microcomputer 62 via cable 111 so that it can operate as a closed loop position control system. Film control microcomputer 62 will determine the home or reference position for the movable lens elements of zoom lens 100 after every reset or power-up situation. When the home position is established the film control microcomputer 62 would clear its internal lens position counter which indicates the total counts received from incremental encoder 104 which are directly proportional to the distance that the movable elements of the lens are from the home position. Microcomputer 62 will then go to a look-up table (in EPROM 68) to determine the number of counts or distance from the home position, for a given focal length, that the lens elements of zoom lens 100 must move.

The position control servo system is shown in FIG. 5 and is used to control the zoom lens focal length selection apparatus associated with lens 100. Microcomputer 62 used to synchronize the film transport speed with the document transport described earlier, is also used in determining the selection of the focal length of zoom lens 100.

A document 101 to be microfilmed is illuminated by fluorescent lamp 103 as it is delivered to the exposure station by the document transport (not shown in FIG. 5 for sake of clarity). The image of the document 101 is directed through zoom lens 100 where the image 105 is reduced in accordance with the reduction ratio selected by the operator via keyboard 61. The reduced image is used to expose the microfilm 107 as it passes through the film gate 109. A digital to analog converter (DAC) 108 is connected to the data bus of microcomputer 62. The DAC 108 is bipolar which means that its output can swing both positive as well as negative so that lens drive motor 102 can be driven in opposite directions. An amplifier 110 is used to amplify the output of the DAC 108 and provides sufficient power to drive lens drive motor 102 via cable 113. The lens drive motor 102 is a DC servo motor with a high resolution optical incremental encoder 104 (about 1000 pulses per revolution) attached to the rear portion of the motor shaft 112. The other end of the motor shaft 112 has a gear 114 mounted thereon which meshes with a partial gear ring 116 on the lens barrel 118 of zoom lens 100, such that rotation of the motor 102 in either direction causes the telescopic lens carrying portion 120 and other internal lens carrying elements to move axially relative to lens barrel 118, depending on the direction of rotation of motor 102.

The output of the encoder 104 is connected to one of the 16-bit timer/counters within the microcomputer 62. Microcomputer 62 uses the output signal to encoder 104 to stabilize the servo loop and to determine the position of the movable lens elements of zoom lens 100 from a home or known reference position.

Figure 6:
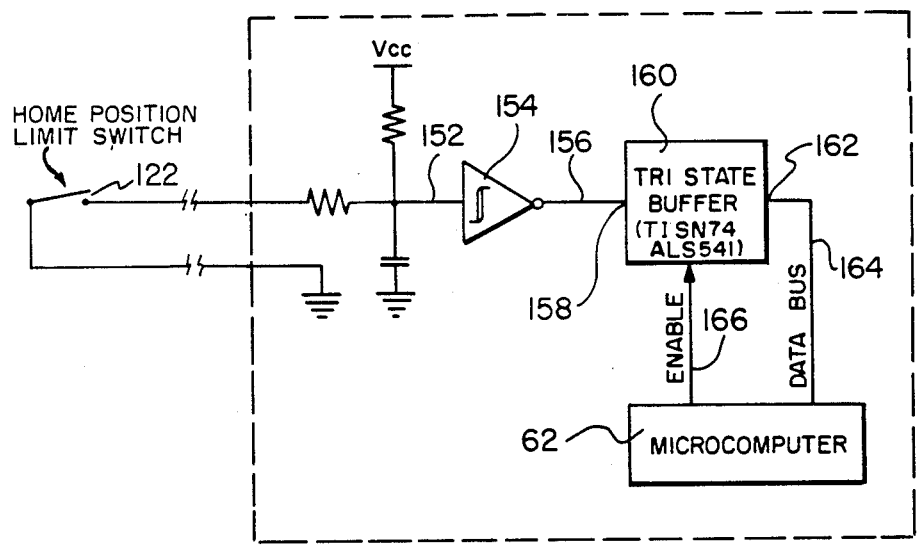
FIG. 6 is a circuit diagram illustrating in detail how the home position limit switch is used to establish a home or reference position for the zoom lens.

FIG. 6 illustrates schematically how the home position limit switch 122 is connected to microcomputer 62. If the home position limit switch is in the open position, a logic one "1" would be placed at the input 152 to the Schmitt trigger 154 (TI SN74LS14) which is inverted to a logic zero "0" at output 156 of the Schmitt trigger 154. When the home position limit switch 122 is closed when the lens is brought to its home position, a logic zero "0" would be present on input 152 Schmitt trigger 154. Once again, inversion by Schmitt trigger 154 results in a logic "1" at its output 156.

The output 156 of Schmitt trigger 154 is directed to a tri-state buffer 160 (TI SN74ALS541). The input signal 158 to tri-state buffer 160 is not transferred to its output 162, which is connected to data bus 164 (data bus not shown in FIG. 3) of microcomputer 62. The signals on the input 158 of the tri-state buffer are not to get transferred to its output until microcomputer 62 enables buffer 160 via line 166. As long as tri-state buffer 160 remains disabled, its output 162 state does not reflect its input 158. This state is known as the high impedance state. However, when tri-state buffer 160 is enabled by the microcomputer 62, whatever data state exists on its input 158 is transferred to its output 162 which as mentioned earlier, is connected to data bus 164 so that the data may be read into the computer 62.

In determining the home position, the microcomputer 62 first enables the tri-state buffer 160 (FIG. 6) via enable line 166 which allows the microcomputer 62 to monitor the output 162 of tri-state buffer 160 to determine if there is a change in the home position limit switch 122 such as when it closes when zoom lens 100 is in its home position. Microcomputer 62 then turns on lens drive motor 102 and drives the motor in the direction that moves the lens toward its home position. When the home position limit switch 122 closes a transition is detected in the output 162 of tri-state buffer 160. Microcomputer 62 immediately stops lens drive motor 102. At this time, it also disables the tri-state buffer 160 via line 166. Microcomputer 62 no longer monitors the condition of limit switch 122 and then drives the motor in the opposite direction at a very slow speed, while simultaneously monitoring the output of encoder 104 looking for an index or reference pulse on cable 111 which is generated only once during each revolution of the motor. When this pulse is detected, microcomputer 62 immediately stops motor 102, and determines this position as the reference or home position with a great deal of accuracy and repeatability. At this time, it also resets or clears out its 34-bit position counter and 16-bit timer/counter.

Thus, the location of the lens elements from the reference position is in direct correlation with the focal length of the lens at the position. Microcomputer 62 can accurately determine the position of the lens elements using the internal 16-bit timer/counter, and the memory based 24-bit position counter, the contents of which indicates the distance the movable lens elements are from the home position.

When a specific focal length is requested by the operator via keyboard 61 into host computer 60 and then to microcomputer 62 which uses a look-up table located in EPROM 68 to look up the focal length or reduction ratio requested and obtains from the table the distance the movable lens elements should be moved from the home position, and the direction in which to move the lens elements for any subsequent requests received from the operator. The specific value that microcomputer obtains from the look-up table will show where the desired position should be; the difference between the current position and the desired position determines the value sent to the DAC 108 and the direction the motor should rotate, which in turn causes the lens barrel 118 to move as a result of the motor 102 being driven in a particular direction. The pulses generated by the optical encoder 104 are accumulated as stated earlier, in one of microcomputer 62's internal 16-bit timer/counters and its 24-bit position counter. Microcomputer 62 monitors the contents of the position counter to determine how far the lens elements are from the home position and hence from the desired position. When the desired position is reached, the microcomputer stops the lens drive motor 102.

In a similar fashion, zoom lens 100 with a continuously variable focal length can be implemented, requiring a more extensive look-up table. However, use of such a lens would provide a continuous range of reduction ratios between the focal length limits of the lens. This type of lens offers the advantage that the microfilmer incorporating it would be capable of offering all the standard reduction ratios presently in use as well as being capable of accommodating any newly adopted standards in the future.

Advantages and Industrial Applicability

Use of the present invention offers advantages in machine flexibility by giving a microfilm operator the ability to easily change the lens focal length and hence the reduction ratio in a microfilmer when different jobs or documents may require different reduction ratios to obtain the desired size of the image on the film. The user/operator does not have to handle the lens to obtain the desired image reduction ratio. By eliminating the need to handle the lens, the risk of dropping, soiling or damaging a lens has been eliminated.

The invention is useful in automatic microfilm cameras capable of filming documents at a number of different reduction ratios. A document transport enhances the filming rate by advancing documents of different sizes through an exposure station and depositing them in a bin or hopper after being photographed. According to the invention, the microfilmer's computer based on information received from the operator via a keyboard, selects the appropriate lens focal length from a plurality of focal lengths available on a zoom lens, to thereby provide the desired reduction ratio.

What is claimed is:

1. A microfilm camera having a document transport system, a film drive and a lens assembly adjustable to provide a plurality of different reduction ratios, said camera comprising:
   means for driving said document transport system;
   means for monitoring the speed of said document transport system and generating a first signal proportional thereto;
   means for driving said film drive;
   a drive motor for adjusting said lens assembly;
   input means for selecting a desired image reduction ratio; and
   control means responsive to said input means for controlling the speed of said film drive in response to said first signal for electronically synchronizing the speed of said film drive to the speed of said document transport system in accordance with said image reduction ratio, and for adjusting said lens assembly by means of said drive motor in accordance with said input means.

2. The invention according to claim 1 wherein said control means further comprises an optical encoder operatively connected to said drive motor.

3. The invention according to claim 2 wherein said optical encoder generates a series of pulses during the movement of said drive motor and said lens assembly.

4. The invention according to claim 3 wherein said control means further comprises reference position sensor means for detecting a reference position of an element of said lens assembly.

5. The invention according to claim 4 wherein said electronic control means further comprises keyboard means for entering a desired optical reduction ratio.

6. The invention according to claim 5 wherein said control means determines an adjustment condition of said lens assembly in response to said series of pulses from said optical encoder and produces an adjustment signal from said reference position sensor means in accordance with an entered reduction ratio.

7. The invention according to claim 6 wherein said lens assembly drive means is a substantially continuously variable lens adjustment system.

* * * * *